Dec. 4, 1962 R. G. BEALS 3,066,931
C-CLAMPS WITH RATCHET ACTION SCREWS
Filed Jan. 21, 1960 2 Sheets-Sheet 1
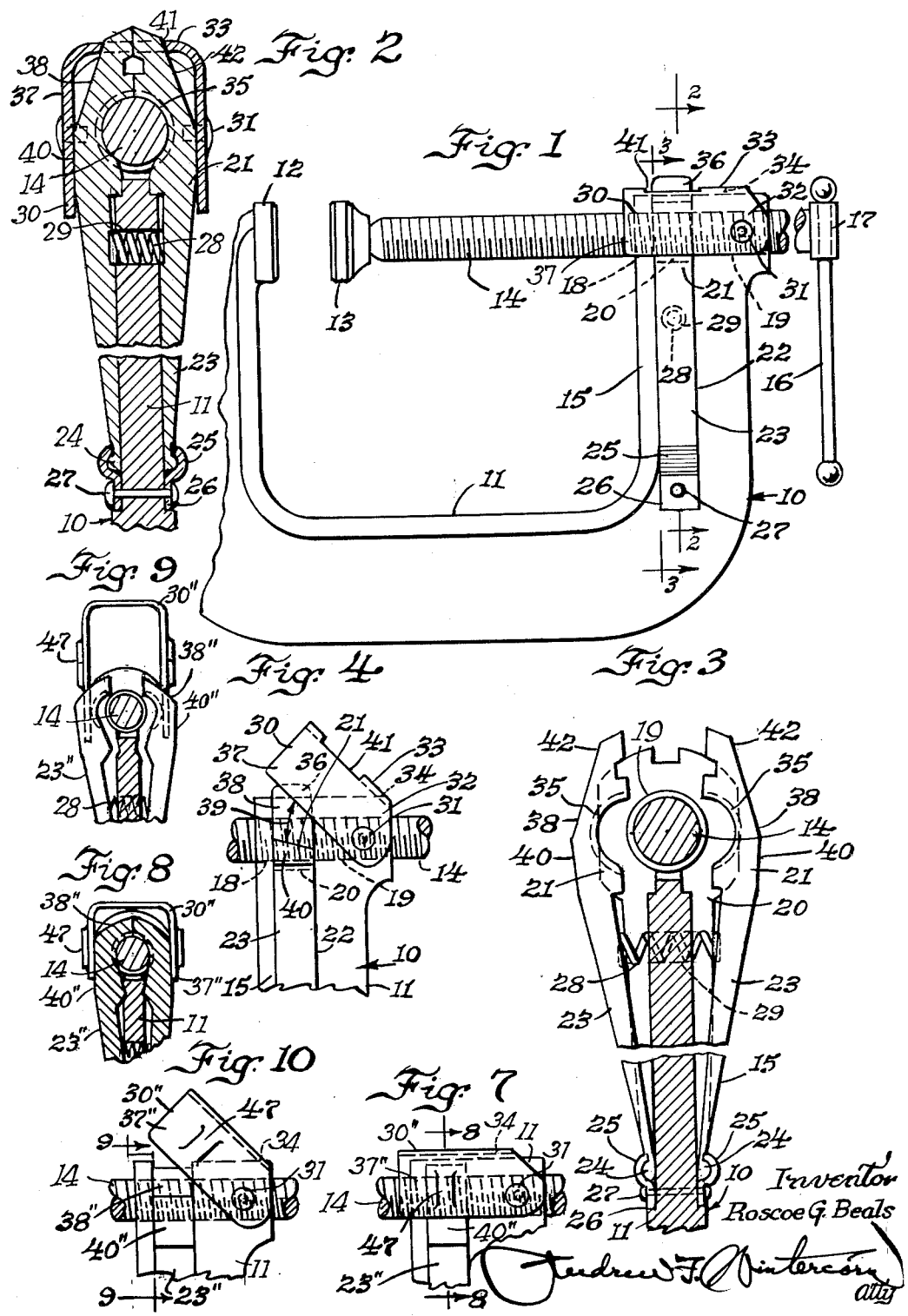
Inventor
Roscoe G. Beals Dec. 4, 1962   R. G. BEALS   3,066,931
C-CLAMPS WITH RATCHET ACTION SCREWS
Filed Jan. 21, 1960   2 Sheets-Sheet 2
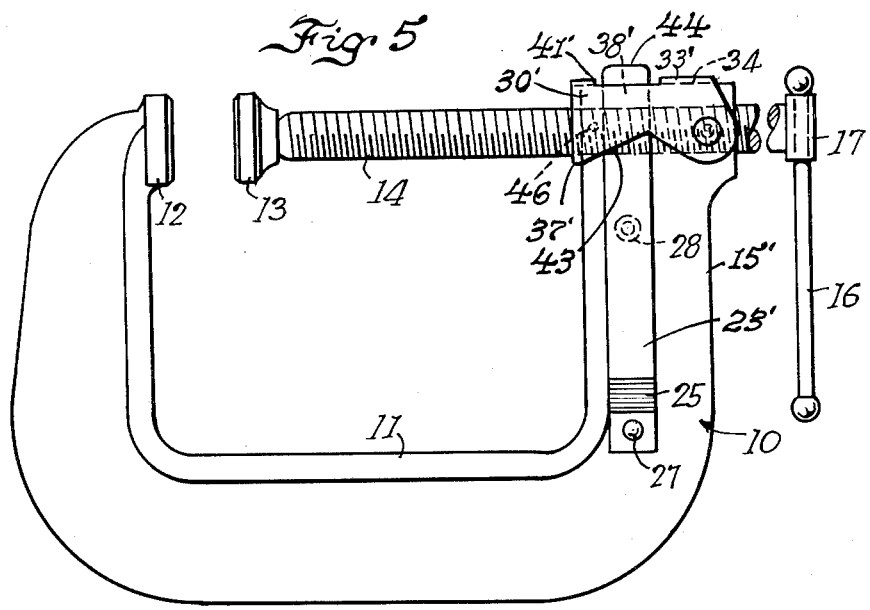
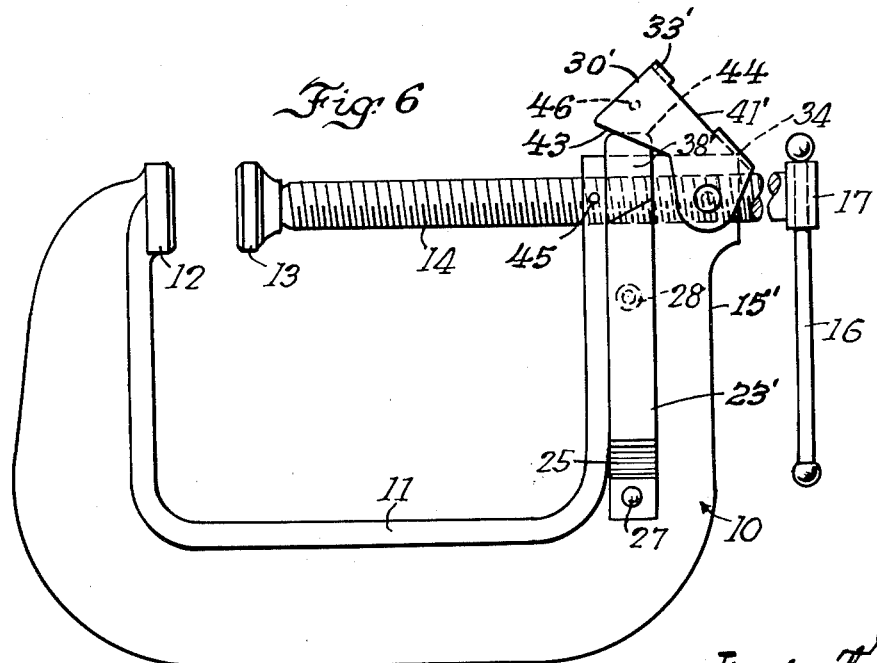
Inventor
Roscoe G. Beals

United States Patent Office 3,066,931
Patented Dec. 4, 1962

3,066,931
C-CLAMPS WITH RATCHET ACTION SCREWS
Roscoe G. Beals, 601 Normal Road, De Kalb, Ill.
Filed Jan. 21, 1960, Ser. No. 3,772
4 Claims. (Cl. 269—173)

This invention relates to improvements in C-clamps designed to speed up the operation thereof by reducing the time now wasted in laboriously threading the clamp screw long distances both ways.

I am aware that efforts have been made to get around the difficulty mentioned by providing a split nut in the C-clamp frame, but most of these earlier constructions C-clamp frame, but most of these earlier constructions have been impractical for one reason or another and too expensive, with the result that such C-clamps are not presently available on the market to any appreciable extent.

It is therefore the principal object of my invention to provide a C-clamp operating on the split nut principle for the desired speedier operation of the screw but including a U-shaped catch pivotally mounted on the frame adjacent the split nut and swingable quickly and easily to and from an operative position holding the halves of the split nut firmly in mesh with the screw, the halves of the split nut being urged apart out of mesh with the screw by means of a return spring and the opposite side portions of the cage cooperating with cam surfaces on the nut halves to wedge the latter inwardly against resistance of their return spring, the cage, in the preferred forms, having an opening in the cross-portion of the U through which free end portions on the hinged halves of the nut are arranged to project in the locked position, so that the wedging engagement of these end portions on opposite sides of the opening in the cage, added to the surface to surface engagement between the side walls of the cage and the flat outer faces on the halves of the nut insure a reliable lockup of the nut, while still enabling the desired quick opening operation. With the other construction herein disclosed, only the surface to surface engagement between the side walls of the cage and the flat surfaces on the halves of the nut is provided, but, in that case, to reduce likelihood of the side walls of the cage yielding too easily or being deformed by repeated opening and closing of the nut, these walls are preferably formed with reinforcing vertical ribs. In both forms, the cross-portion of the U-shaped cage is cut away at the pivoted end in a predetermined relationship to the frame and pivot axis to limit the retracting movement, so that the opening up of the nut under spring action is positively limited by the side walls of the cage overlapping corner portions on the nut halves at their reduced free ends, thereby maintaining the desired operative relationship between the parts and reducing time lost in the closing operation.

The invention is illustrated in the accompanying drawings, in which—

FIG. 1 is a side view of a C-clamp made in accordance with my invention, an intermediate portion of the length of the clamping screw being broken away to save space and enable showing the clamp on a larger scale;

FIG. 2 is a cross-section on the line 2—2 of FIG. 1 on the same enlarged scale as FIG. 3;

FIG. 3 is a view similar to FIG. 2, showing the split nut opened;

FIG. 4 is a fragmentary side view similar to FIG. 1, showing the cage opened;

FIGS. 5 and 6 are side views corresponding to FIGS. 1 and 4 but showing a modified or alternative construction, and FIGS. 7 to 10 are fragmentary views corresponding to FIGS. 1 to 4, respectively, but showing another modified or alternative construction, FIG. 8 of this group being a section on the line 8—8 of FIG. 7, on the same scale.

Similar reference numerals are applied to corresponding parts throughout the views.

Referring first to FIGS. 1 to 4, the reference numeral 10 designates a C-clamp, the C-shaped frame 11 of which provides the usual stationary jaw 12 cooperating with the movable jaw 13 in the form of a pad member swivelled on the inner end of the thrust screw 14. The screw 14, which in the ordinary unimproved C-clamp threads directly in a bearing in the arm 15 and is arranged to be turned in either direction by means of a handle 16 slidably mounted in a cross-head 17 provided on the outer end of the screw, is, in accordance with the present invention, slidable endwise in aligned bearings 18 and 19 provided in the arm 15 on opposite sides of the gap or cut-away portion 20 in which the two halves of the split nut 21 operate. The arm 15 has longitudinally extending grooves 22 provided therein on opposite sides in which elongated arms 23 integral with the halves 21 of the nut are disposed with a free working fit, the lower ends 24 of these arms being given a cylindrical hinge knuckle form for pivotal mounting of the arms 23 on the arm 15 by means of the hook-shaped end portions 25 of a pair of attaching plates 26, which are secured to the arm 15 by means of a rivet 27. A coiled compression spring 28 housed in a transverse bore 29 in the arm 15 has engagement at its opposite ends with the arms 23 intermediate the ends thereof and serves to spread the nut halves 21 apart and out of mesh with the screw 14 when the cage 30 is swung upwardly away from the nut 21, as shown in FIG. 4. The cage 30 is pivoted on the arm 15 at 31 on an axis at right angles to and intersecting the axis of screw 14, as clearly appears in FIGS. 1 and 4, the cage being U-shaped in cross-section and straddling the end of the arm 15 so as to provide a pair of ears 32 on one end thereof on opposite sides of the arm 15. The ears 32 have openings provided therein to receive pivot pins 31 extending outwardly from arm 15. The cross-portion 33 of the U-shaped cage is cut away, as indicated at 34 on the pivoted end of the cage to define a stop which by engagement with the end of the arm 15 limits the outward swing of the cage to approximately 45° of movement, as seen in FIG. 4, and with the cage in that position, the halves 21 of the nut are spread apart enough to have the threads 35 thereof completely disengaged from the threads of the screw 14, approximately as shown in FIG. 3, while corner portions 36 on the reduced free ends of the arms 23 are still housed between the side walls 37 of the cage, as clearly appears in FIG. 4, so that the halves 21 of the nut cannot spread apart any farther and the parts are arranged so that when the cage 30 is swung inwardly back to the position shown in FIG. 1, the nut halves 21 will be closed again on opposite sides of screw 14 and the screw 14 of the C-clamp can be tightened on the work in the same way as with an ordinary C-clamp. The outer sides 38 of the free end portions of the arms 23 are inclined in downwardly diverging relation for a wedge or ramp-shape throughout the angle indicated by the arc 39 in FIG. 4, and these ramps terminate in flat surfaces 40 which in the closed position of the nut halves 21 are substantially parallel to one another, so that in the inward swing of the cage 30 throughout the angle 39 the nut halves 21 are closed on the screw 14 by wedging engagement of the edge portions of the side walls 37 on the ramp surfaces 38, but the side walls 37 thereafter have surface to surface engagement with the flats 40 upon the ramps 38 and accordingly hold the nut halves firmly in mesh with the screw 14. The reduced extremities 36 of the arms 23, which, being a continuation of the ramps 38 are also tapered, as at 42, are arranged to project through the opening 41 in the cross-portion 33 of the U-shaped cage 30 in the closed position of the latter, as seen in FIG. 1, and the wedging engagement of these tapered end portions on opposite sides of the opening 41 contributes a great deal to the tightness of the lockup action obtained when the cage 30 has been closed fully on the split nut 21.

The construction of FIGS. 5 and 6 is closely similar to that of FIGS. 1 to 4, but in the construction of FIGS. 5 and 6 the cage 30' has slantingly cut bottom edges 43 on the side walls 37 of the U-shaped cage 30' which limit separation of the arms 23' in the fully opened position of cage 30' shown in FIG. 6 and insure enough side wall area in contact with corner portions on the outer ends 44 of the arms 23' so that the edge portions 43 sliding on the ramp surfaces 38' that are housed within the cage 30' will cause closing of the split nut on the screw 14 when the cage is disposed as seen in FIG. 5. Here again the reduced end portions 44 project through an opening 41' in the cross-portion 33' of the U-shaped cage 30' for an improved tighter lockup action when the cage 30' is fully closed. However, a spring-pressed ball detent 45 on at least one side of the arm 15' is arranged to snap into a depression defined at 46 in one of the side walls 37' of the cage 30' to lock the cage 30' more securely in closed position.

In the other form shown in FIGS. 7 to 10 the cage 30" is the same as the cage 30 and closes the nut halves be wedging engagement on the ramp surfaces 38" and holds the nut halves closed by surface to surface engagement on the flat surfaces 40", but there is no opening in the cross-portion of the U-shaped cage because the outer ends of the nut halves are fully enclosed by the cage in its closed position, and the side walls 37" of the cage 30" have stiffening ribs 47 formed thereon in right angle relationship to the cross-portion of the U and extending lengthwise with respect to the arms 23" in the closed position of the cage, as seen in FIGS. 7 and 8, whereby to resist spreading of the side walls 37".

It is believed the foregoing description conveys a good understanding of the objects and advantages of my invention. The appended claims have been drawn to cover all legitimate modifications and adaptations.

I claim:

1. In combination, a thrust screw having threads thereon, a frame having spaced coaxially aligned bearings provided thereon in which the screw is slidable endwise, a pair of elongated arms secured at one end on opposite sides of said frame, their other ends being movable toward and away from one another between said bearings and forming together a split nut having threads therein for detachable engagement with the threads on said screw on opposite sides thereof, the split nut ends of said arms having oppositely inclined ramp surfaces provided on the outer sides thereof in outwardly converging relationship with respect to the secured ends of said arms, and an elongated channel shaped cage straddling at least one of the bearings on said frame having substantially parallel side walls pivotally mounted at one end on said frame on an axis in transverse relationship to said screw, the side walls disposed on opposite sides of said frame slidably engaging the ramp surfaces on the split nut ends of said arms to close the split nut on the screw by cam action and holding said nut closed when the cage is swung inwardly to closed operative position on said frame straddling both bearings, said cage having a cross-portion connecting the side walls so arranged with respect to the pivoted end of said cage to have one end portion thereof engage the first mentioned bearing straddled by said cage positively to limit opening of the cage so that portions of the side walls of said cage at the other end overlap the split nut ends of the arms and serve to limit separation of the arms and maintain operative relationship between the cage and the split nut ends of said arms for subsequent closing of the cage and closing of the nut on the screw.

2. The construction set forth in claim 1 wherein the cross-portion of the cage has an opening provided therein intermediate the ends of the cage, the split nut ends of the arms having extremities which in the closed position of the cage project into said opening and have wedging engagement on the opposite sides of said opening by reason of the oppositely inclined ramp surfaces, portions of which are on the sides of these extremities, whereby to insure tighter closing of the nut on the screw.

3. In combination, a thrust screw having threads thereon, a frame having spaced coaxially aligned bearings provided thereon in which the screw is slidable endwise, a pair of elongated arms secured at one end on opposite sides of said frame, their other ends being movable toward and away from one another between said bearings and forming together a split nut having threads therein for detachable engagement with the threads on said screw on opposite sides thereof, the split nut ends of said arms having oppositely inclined ramp surfaces provided on the outer sides thereof in outwardly converging relationship with respect to the secured ends of said arms, a single spring means disposed in an opening provided in said frame having its opposite ends engaging said arms intermediate their ends normally urging the split nut ends of said arms apart, and an elongated channel shaped cage straddling at least one of the bearings on said frame having substantially parallel side walls pivotally mounted at one end on said frame on an axis in transverse relationship to said screw, the side walls disposed on opposite sides of said frame slidably engaging the ramp surfaces on the split nut ends of said arms to close the split nut on the screw by cam action and hold said nut closed when the cage is swung inwardly to closed operative position on said frame straddling both bearings, said cage having a cross-portion connecting the side walls so arranged with respect to the pivoted end of said cage to have one end portion thereof engage the first mentioned bearing straddled by said cage positively to limit opening of the cage so that portions of the side walls of said cage at the other end overlap the split nut ends of the arms and serve to limit separation of the arms under spring action and maintain operative relationship between the cage and the split nut ends of said arms for subsequent closing of the cage and closing of the nut on the screw.

4. The construction set forth in claim 3 wherein the cross-portion of the cage has an opening provided therein intermediate the ends of the cage, the split nut ends of the arms having extremities which in the closed position of the cage project into said opening and have wedging engagement on the opposite sides of said opening by reason of the oppositely inclined ramp surfaces, portions of which are on the sides of these extremities, whereby to insure tighter closing of the nut on the screw.

References Cited in the file of this patent

UNITED STATES PATENTS

| | | |
|---|---|---|
| D. 142,982 | Bloomfield | Nov. 27, 1945 |
| 419,254 | Hoskins | Jan. 14, 1890 |
| 444,484 | Brown | Jan. 13, 1891 |
| 1,001,042 | Kadel | Aug. 22, 1911 |
| 1,025,377 | Craig | May 7, 1912 |
| 1,036,386 | Van Denburg | Aug. 20, 1912 |
| 1,452,384 | Kissendorfer | Apr. 17, 1923 |
| 2,546,336 | Gibbons | Mar. 27, 1951 |
| 2,705,983 | Guadagna | Apr. 12, 1955 |